UNITED STATES PATENT OFFICE.

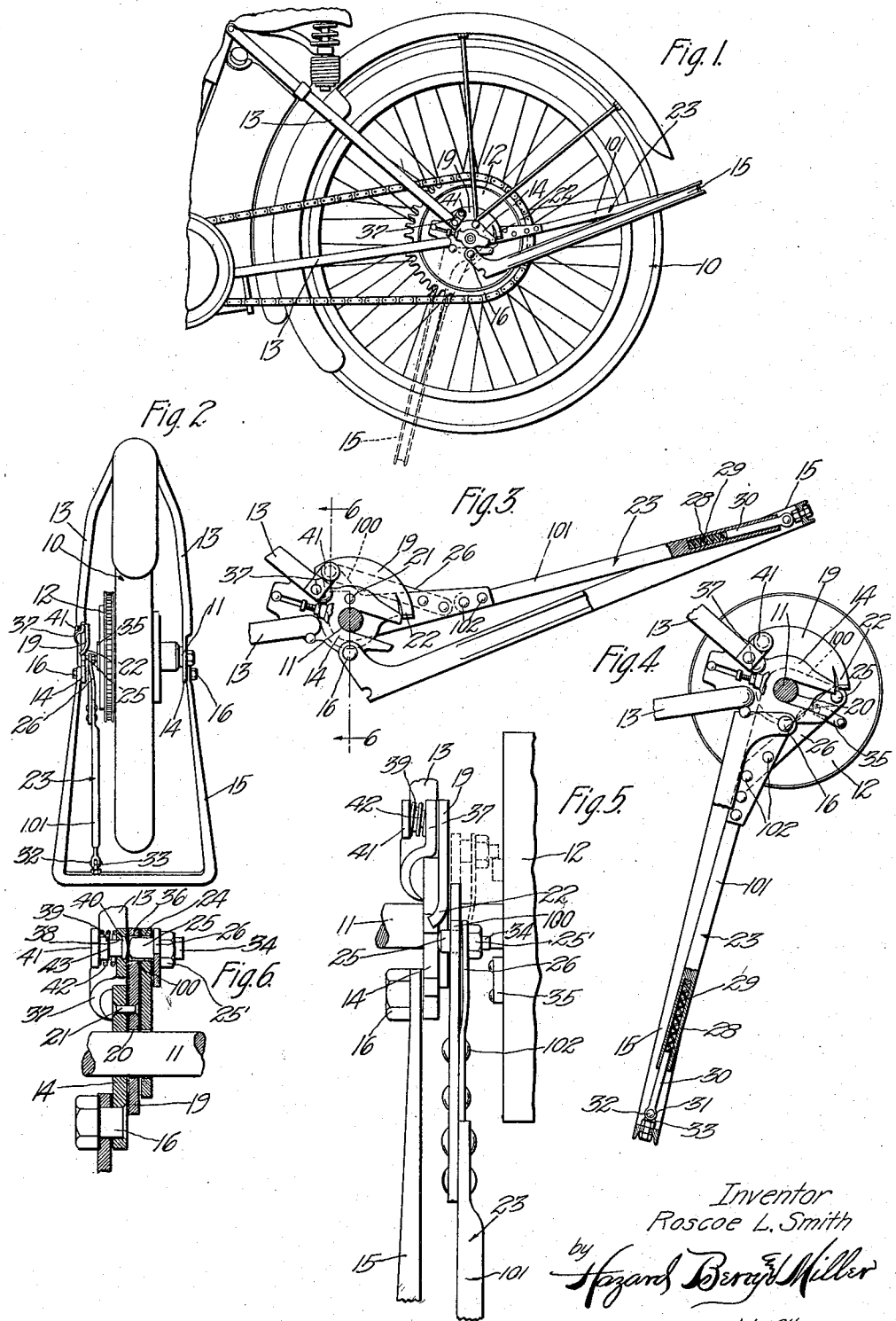
R. L. SMITH.
AUTOMATIC LIFT FOR MOTOR CYCLE OR BICYCLE STANDS.
APPLICATION FILED MAR. 15, 1916.
1,201,374.
Patented Oct. 17, 1916.
Inventor
Roscoe L. Smith
his Attorneys.

ROSCOE L. SMITH, OF SANTA ANA, CALIFORNIA.

AUTOMATIC LIFT FOR MOTOR-CYCLE OR BICYCLE STANDS.

1,201,374. Specification of Letters Patent. Patented Oct. 17, 1916.

Application filed March 15, 1916. Serial No. 84,410.

*To all whom it may concern:*

Be it known that I, ROSCOE L. SMITH, a citizen of the United States, residing at Santa Ana, in the county of Orange and State of California, have invented new and useful Improvements in Automatic Lifts for Motor-Cycle or Bicycle Stands, of which the following is a specification.

My invention relates to an automatic lift for motorcycle stands.

It is an object of this invention to provide an automatic lift for a motorcycle stand which is superior to the motorcycle stands now commonly in use in its simplicity of construction and positiveness of action and which may be easily applied to any motorcycle in use.

With the above and other objects in view which will appear as the description proceeds, my invention consists in the construction, arrangement and combination of parts hereinafter described and claimed.

In the accompanying drawings which form a part of this specification, I have illustrated a convenient and practical embodiment of my invention and in which:

Figure 1 is a side elevation of the rear wheel of a motorcycle to which my invention is applied. Fig. 2 is an elevation from the rear of the same showing the stand in use. Fig. 3 is a side elevation of the stand with parts broken away showing the same in its lifted position. Fig. 4 is a side elevation with parts broken away of the stand showing the same in its operative position. Fig. 5 is a rear elevation of the stand showing it mounted on the axle of the rear wheel of a motorcycle. Fig. 6 is a sectional view taken on line 6—6, Fig. 3.

Referring to the drawings, 10 represents the rear wheel of a motorcycle, and 11 the axle of said wheel.

12 designates the driven gear fast to said wheel.

13, 13 are frame members, on opposite sides of the wheel, each having at its rear end a forked bearing plate 14. The outer ends of the axle 11 are mounted on said plates. The stand has the usual shape of a U-shaped member 15 with the upper ends pivoted at 16 below the axle 11 to the forked plate 14.

My improved automatic stand lift comprises a cam-plate 19 which is securely mounted on the inner face of one of the forked plates 14 by means of a rivet 21. The cam plate is substantially of the shape of a sector of a circle and is provided with a bore 20 through which the axle 11 of the rear wheel 10 passes. The arched shaped portion of the cam plate is at the upper end and is provided at its rear end with an outwardly bent tongue or strip 22 for a purpose hereinafter to be described. The upper front portion of the cam plate 19 is provided with an aperture 36 for the reception of a locking pin hereinafter referred to. Pivotally mounted on the axle 11 and immediately adjacent to the rear face of the cam plate 19 is a stand lifting lever 23. The stand lifting lever has the shape of a bell crank lever with an upper short arm 100 and a lower long arm 101 and is provided with a circular bore 24 in which a movable locking pin 25 is disposed. The locking pin 25 is carried at the upper end of a strong leaf spring 26 arranged to the rear of the lifting lever 23, and has its lower end rigidly secured to the long arm 101 of the lifting lever 23 by any suitable means such as rivets 102. The leaf spring 26 tends to press the locking pin 25 carried at its upper end against the cam plate 19.

The lower end of the long arm 101 of the lifting lever 23 is provided with a longitudinal socket 28 in which a helical spring 29 is disposed. Extending into said socket and against the tension of said spring is a connecting rod 30 whose lower end is forked and provided with a pair of apertures 31 through which a rivet or bolt 32 passes connecting the rod 30 to an apertured lug 33 mounted on the transverse member of the stand 15. From the construction just described relating to the connection of the end of the long arm 101 of the stand lifting lever with the transverse member of the stand, it will be understood that compensation is provided for the fact that the fulcrums of the lifting lever and stand respectively, are not concentric. The helical spring 29 in the socket 28 will prevent any lost motion between the connection rod 30 and the long arm 101, and thereby prevent any noise due to such lost motion.

The locking pin 25 is securely mounted on the outer end of the leaf spring 26, being preferably screw threaded therein, and locked in place by a nut 25', the inner end of the pin 25 projecting beyond the nut 25', forming a lifting lug 34 adapted to be engaged by a dog 35 rigidly mounted on the outer face of the driven gear 12.

The following mechanism is provided for moving the locking pin 25 from its locking position in the locking aperture 36 in the front portion of the plate 19: A short arm or clip 37 is suitably secured to one of the frame members 13. In the free end of the clip 37 is a counter-bored aperture 38 in axial alinement with locking aperture 36 in said plate. A release bolt 39 is slidably mounted in the aperture 38 and is provided with an enlarged convex head 40 at one end and a push button 41 at the outer end. A helical spring 42 encircling the release bolt 39 is disposed between the plate 19 and the button 41 tending to hold the release bolt in inoperative position with its enlarged head 40 seated in the aperture 38 of the clip. The release bolt is provided with a shoulder 43 adjacent to the push button 41, said shoulder serving to limit the forward movement of the bolt. When it is desired to move the locking pin 25 out of its locking position, the push button 41 is pressed inwardly against the tension of the spring 42, thereby moving the locking pin out of its engagement with the locking aperture 36 so that the outer convex end of said locking pin will be in a plane with the inner face of the plate 19 and free to move along the inner face thereof. The stand will, when free to move, drop vertically downward and may be quickly placed in proper position for supporting the motorcycle.

Operation: When the motorcycle stand is in use and occupies the position shown in Figs. 2 and 4, the locking pin 25 will be in the position clearly shown in Fig. 5. In this position, the same is slightly below the outer end of the tongue 22, the action of the leaf spring 26 pressing said locking pin outwardly until the upper end of the leaf spring is flush against the inner face of the short arm 100 of the lifting lever 23. The lifting lug 34 on the other end of the locking pin is out of the path of the dog 35 on the driven gear 12. As soon as the stand is kicked off, and moved slightly to the rear, the locking pin 25 will slide along the curved tongue 22 of the cam plate 19 and will be forced inwardly against the tension of the spring 26. In this position, the lifting lug 34 is in the path of the dog 35 on the driven gear 12 and as said gear is rotated, the dog 35 will engage the lug 34 and lift the same upwardly, the outer end of the locking pin sliding along the inner face of the cam plate 19 until it registers with a locking aperture 36 in the upper or front portion of said cam plate. The tension of the leaf spring 26 will cause the locking pin 25 to engage the locking aperture 36 of the cam plate 19 and move said pin outwardly. This outward movement of the locking pin will cause the lifting lug 34 to move out of engagement with the dog 35 on the driven gear 12 and out of the path of the same as the latter is rotated as the motorcycle travels. When the locking pin is in its locking position as shown in Fig. 3, the long arm 101 of the lifting lever 23 will be inclined slightly upwardly and will hold the stand in its lifted and inoperative position. When it is desired to use the stand, the locking pin 25 is moved from its locking position by pressing the release bolt 39 inwardly against the locking pin 25, allowing the latter to move freely along the inner face of the cam plate 19. The outer end of the stand 15 will move to the ground due to the action of gravity, and may be moved into its normal supporting position slightly in advance of the axle of the rear wheel.

From the foregoing description it will be evident that I have devised an exceedingly simple automatic lift for motorcycle stands, positive in action and not liable to get out of order and composed of a minimum number of parts. When the stand is in its lifted or inoperative position, it will be maintained rigidly, provisions having been made to prevent rattling by taking up any lost motion between the stand and the stand lifting lever.

I have described the automatic lift for the stand of a motorcycle, but it will be understood that the same is equally adapted and applicable to a bicycle stand.

While I have shown the preferred construction of the automatic lift for motorcycle or bicycle stands as now known to me, it will be obvious that various changes in the construction, arrangement and combination of parts may be made by those skilled in the art without departing from the spirit of my invention as defined in the appended claims.

I claim:

1. In an automatic lifter for motorcycle stands and the like, the combination of a rear wheel of a motorcycle, an axle therefor, frame members supporting said axle, a stand pivoted on said frame members below said axle, a stand locking plate rigidly mounted on said frame members, said plate having an outwardly bent cam portion at the rear thereof, the front portion of said plate being provided with a locking aperture for the reception of a locking pin, a stand lifting bell crank lever pivoted on said axle and immediately adjacent to the inner side of said plate, said lever being yieldingly connected to said stand and having an aperture adapted to register with the aperture in said plate, a flat spring rigidly mounted at one end to said lever and carrying a locking pin at the other end, said pin being slidably mounted in the aperture of said lever, a lifting lug at the opposite end of said pin, a dog rigidly connected to said wheel and adapted to engage said lug for lifting said stand, and a spring controlled release bolt mounted on the outer face of said plate for moving said pin from its locking position.

2. In an automatic lifter for motorcycle stands and the like, the combination of a rear wheel of a motorcycle, an axle therefor, frame members supporting said axle, a stand pivoted on said frame members, a fixed stand locking plate, said plate having an outwardly bent cam portion at the rear thereof, the front portion of said plate being provided with a locking aperture for the reception of a locking pin, a stand lifting lever pivoted on said axle, said lever having an aperture adapted to register with the aperture in said plate, a flat spring rigidly mounted on said lever and carrying a locking pin, said pin being slidably mounted in the aperture of said lever, a lifting lug at the opposite side of said pin, a dog connected to said wheel and adapted to engage said lug and lift said stand, and manually operated means for moving said pin from its locking position.

3. In an automatic lifter for motorcycle stands and the like, the combination of a rear wheel of a motorcycle, an axle therefor, frame members supporting said axle, a stand pivoted on said frame members, a stand locking plate rigidly connected to said frame members, said plate having an outwardly bent cam portion at the rear thereof, the front portion of said plate being provided with a locking aperture for the reception of a locking pin, a stand lifting lever pivoted on said axle and permanently connected to said stand, said lever having an aperture adapted to register with the aperture in said plate, a spring connected to said lever and carrying a locking pin, said pin being slidably mounted in the aperture of said lever, a lifting lug connected to said spring, a dog connected to said wheel and adapted to engage said lug for lifting said stand and means for moving said pin from its locking position.

4. In an automatic lifter for motorcycle stands and the like, the combination of a rear wheel of a motorcycle, an axle therefor, a frame member supporting said axle, a pivoted stand, a stationary stand locking plate, a cam connected therewith, said plate being provided with a locking aperture for the reception of a locking pin, a stand lifter lever pivoted to said axle and permanently connected to said stand, said lever having an aperture adapted to register with the aperture in said plate, resilient means connected to said lever, a locking pin carried thereby, said pin being slidably mounted in the aperture of said lever, a lifting lug connected to said pin, means connected to said wheel and adapted to engage said lug for lifting said stand and means for moving said pin from its locking position.

5. In an automatic lifter for motorcycle stands and the like, the combination of a rear wheel, an axle therefor, a pivoted stand, a stationary stand locking plate having a cam connected therewith, said plate being provided with a locking aperture for the reception of a locking member, a pivoted stand lifting lever permanently connected to said stand, said lever having an aperture adapted to register with the aperture in said plate, a locking member resiliently mounted, said locking member being slidably mounted in the aperture of said lever, a lifting lug connected to said locking member, means connected to said wheel and adapted to engage said lug for lifting said stand and means for moving said locking member from its locking position.

6. In an automatic lifter for motorcycle stands and the like, the combination of a rear wheel, an axle therefor, a pivoted stand, a stationary stand locking plate having a cam connected therewith, said plate being provided with a locking aperture for the reception of a locking member, a pivoted stand lifting lever engaging said stand, said lever having an aperture adapted to register with the aperture in said plate, a locking member resiliently mounted, said locking member being slidably mounted in the aperture of said lever, a lifting lug connected to said locking member, means connected to said wheel and adapted to engage said lug for lifting said stand and means for moving said locking member from its locking position.

In testimony whereof I have signed my name to this specification.

ROSCOE L. SMITH.

Copies of this patent may be obtained for five cents each, by addressing the "Commissioner of Patents, Washington, D. C."